United States Patent [19]

Maxwell

[11] 4,125,872
[45] Nov. 14, 1978

[54] MULTILINE AUTOMATIC CALLING SYSTEM ADAPTER
[75] Inventor: Ronald K. Maxwell, Palo Alto, Calif.
[73] Assignee: Racal-Vadic, Inc., Sunnyvale, Calif.
[21] Appl. No.: 783,144
[22] Filed: Mar. 31, 1977
[51] Int. Cl.[2] .............................................. G06F 7/28
[52] U.S. Cl. ................................ 364/900; 179/90 BD
[58] Field of Search ... 364/200 MS File, 900 MS File; 179/90 BD, 2 DP

[56] References Cited
U.S. PATENT DOCUMENTS

| | | | |
|---|---|---|---|
| 3,363,238 | 1/1968 | Clark et al. | 364/900 |
| 3,395,400 | 7/1968 | De Witt et al. | 364/900 |
| 3,516,069 | 6/1970 | Bray et al. | 364/200 |
| 3,543,243 | 11/1970 | Nordquist | 364/900 |
| 3,742,456 | 6/1973 | McFiggans et al. | 364/200 |
| 3,975,712 | 8/1976 | Hepworth et al. | 364/200 |

Primary Examiner—Gareth D. Shaw
Assistant Examiner—C. T. Bartz
Attorney, Agent, or Firm—Lowhurst & Aine

[57] ABSTRACT

Apparatus for controlling an automatic dialer which, in response to dial digits, automatically establishes communication paths over a plurality of telephone lines. The apparatus includes interface logic connected to a computer port for receiving serial digital data from the computer. The data includes control characters and dial digits. The serial data is stored in parallel word format in a random access memory (RAM) buffer. The RAM is operated in three modes, a write mode in which addresses and digits are stored in the RAM, a read mode in which the addresses and digits are presented to the dialer and an abort mode in which a call in progress is interdicted and resumed later, or completely aborted. Control logic responds to the serial interface and stores successive digits in successive RAM address locations, the final word being a buffer empty character to signify the end of the stored data. The control logic then signals the dialer and, under control of a demand/response hand shake procedure, transfers the stored words in parallel to the dialer. The end of the dial data is signified by the decoding by RAM logic of the buffer empty character when it is read from the RAM. The dialer responds to the words and dials the telephone number to thereby connect the computer port to the telephone line through a modem.

7 Claims, 6 Drawing Figures

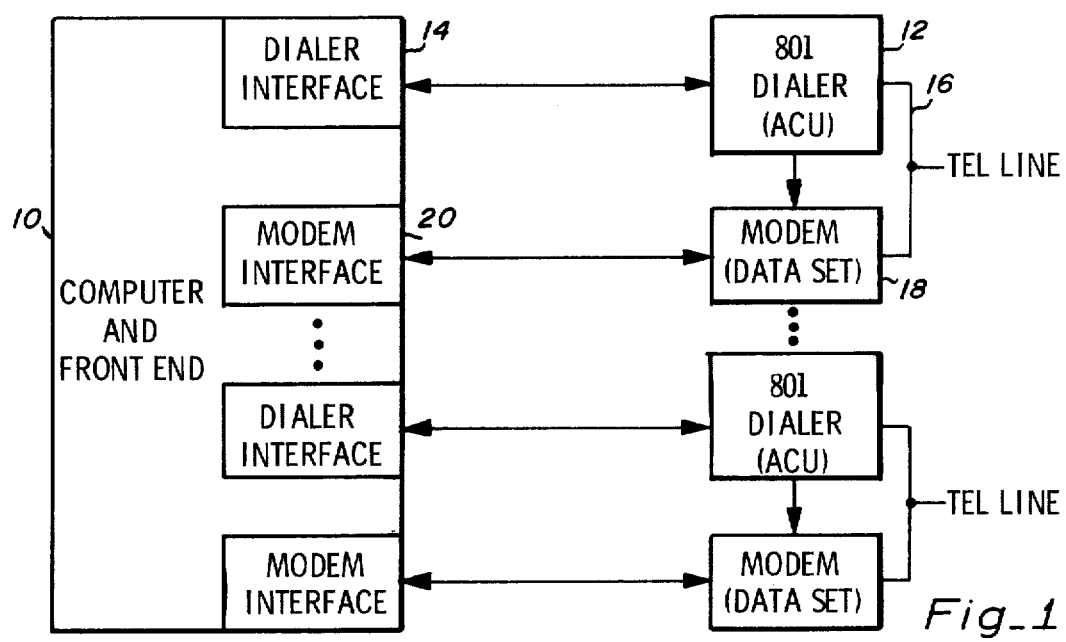
Fig_1 PRIOR ART
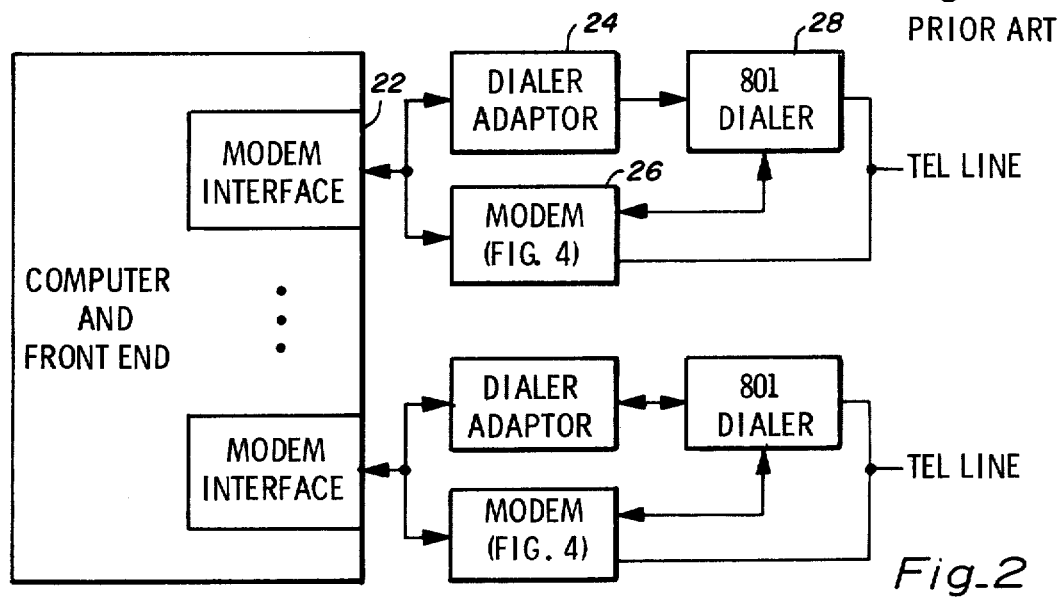
Fig_2
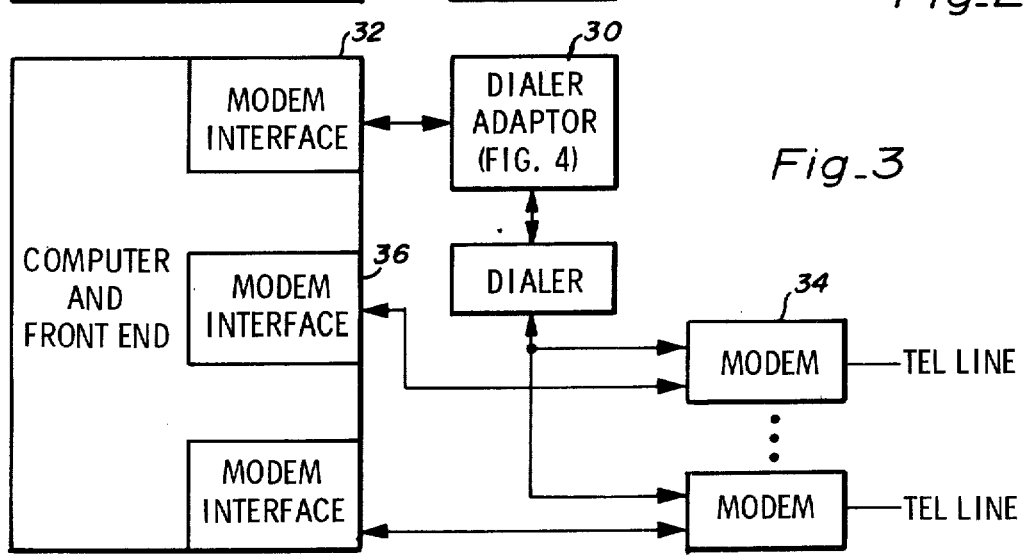
Fig_3

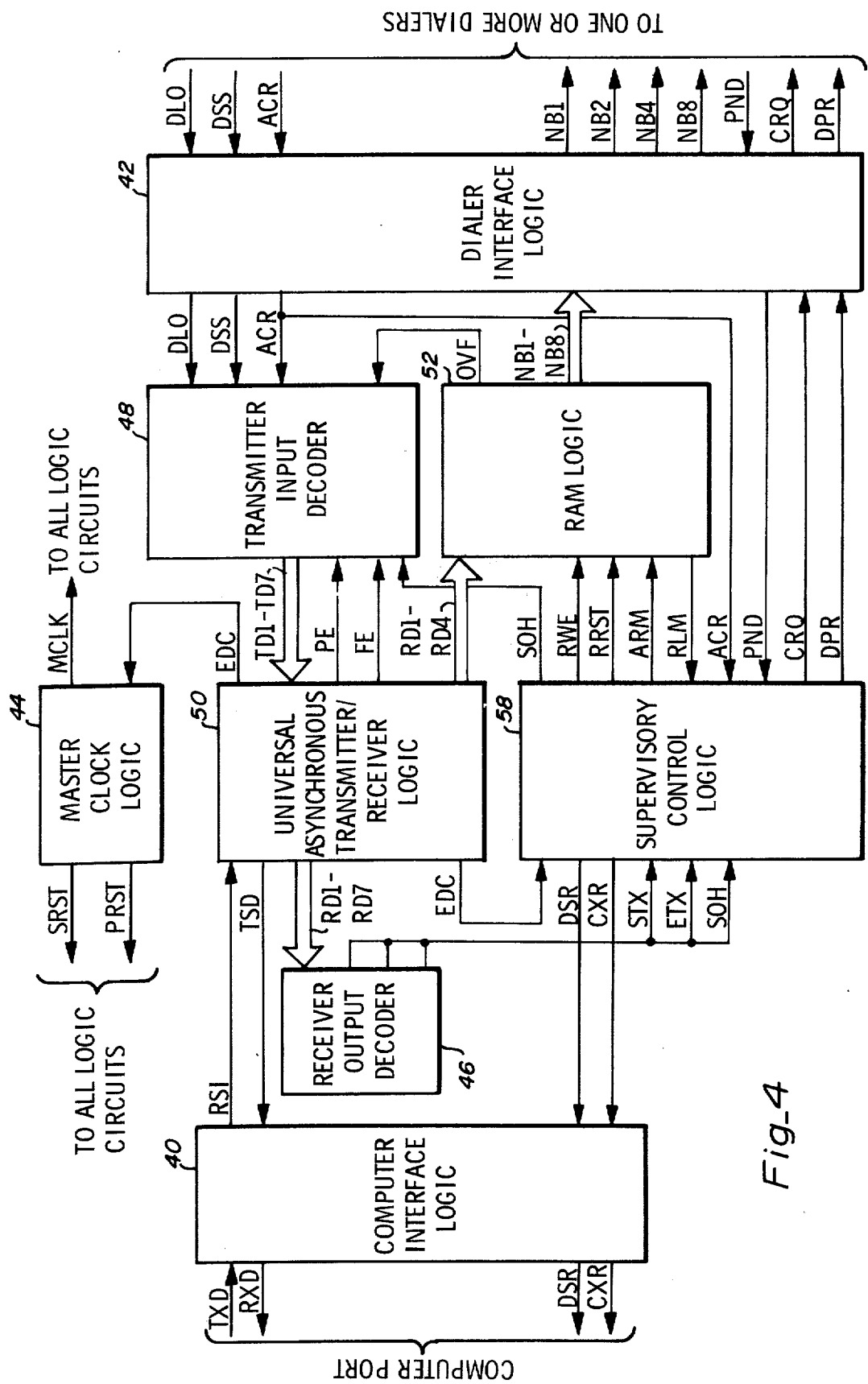
Fig_4

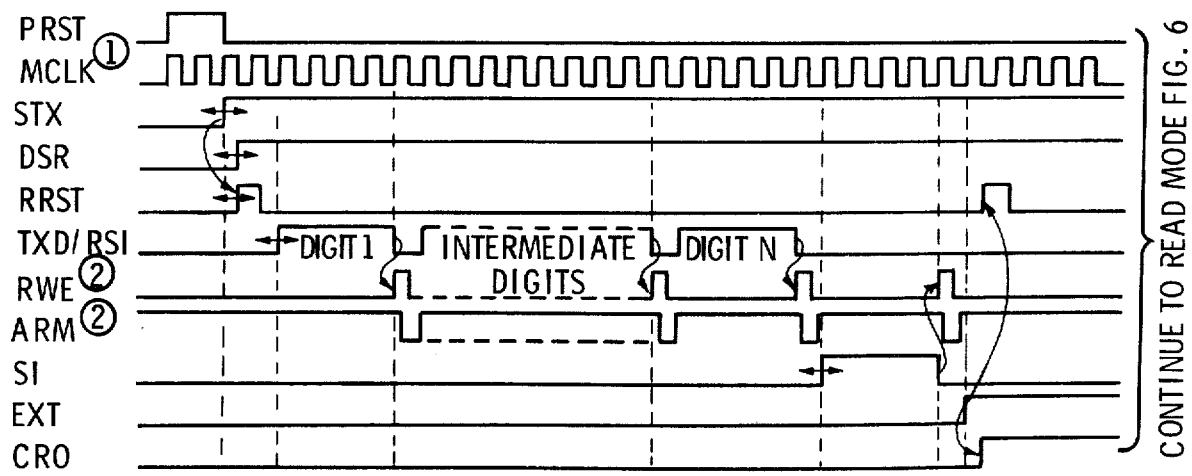
NOTES: ① MASTER CLOCK IS 16 X DATA RATE.
② FREQUENCY OF RWE AND ARM DEPENDS UPON CHARACTER LENGTH (9, 10 OR 11 BITS) AND MASTER CLOCK. FOR EXAMPLE, WITH 10 BIT BYTES, RWE IS ISSUED EVERY 160 CLOCK PERIODS (10 X 16).
Fig_5 WRITE MODE
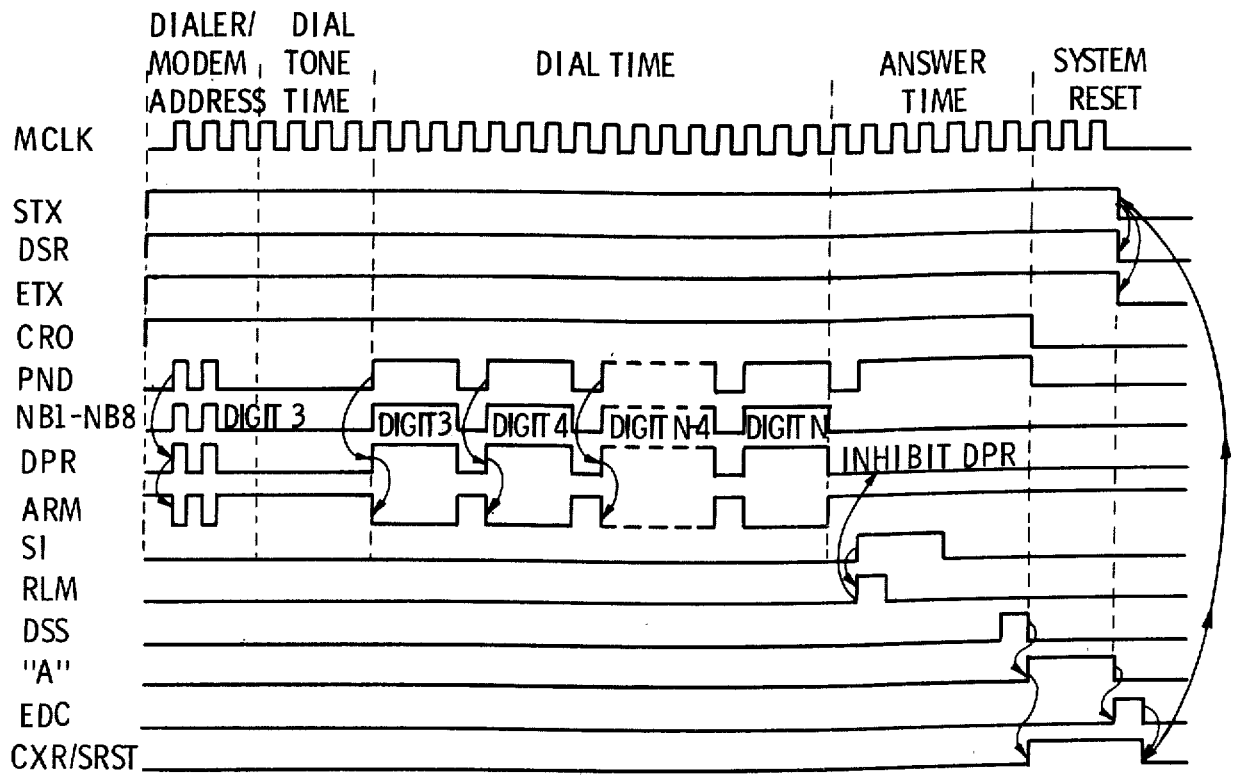
Fig_6 READ MODE

MULTILINE AUTOMATIC CALLING SYSTEM ADAPTER

FIELD OF THE INVENTION

The invention relates to telephone switching systems and more particularly to means for controlling automatic dialing apparatus to thereby automatically connect a telephone line to a modem.

SUMMARY OF THE PREVIOUS STATE OF THE ART

Prior computer-communication facilities that use automatic dialing devices, such as disclosed in U.S. Pat. No. 3,362,015 "Communication Switching Adapter," Mackie et al, require specialized hardware to interface the controller and dialer such as the Western Electric 801A automatic calling unit (ACU). As illustrated in FIG. 1, a separate computer interface is necessary to transfer dialed digits from the computer to the 801 ACU. Each modem and each automatic calling unit is connected to a separate computer interface and to a telephone line which is connected to the dialing equipment of a telephone central office.

In the prior apparatus, dialing is accomplished via the automatic calling unit which is associated with a particular addressed modem or data set. The ACU is attached to a dial interface which is addressed by line address selection means in the same manner as other interfaces in the multiplexer front end. Whenever a modem interface associated with a particular data set modem is selected, the dialer interface associated with the automatic calling unit paired with that data set is also selected by the same address. The computer first establishes connection with the front end and then transfers the address of the desired automatic calling unit along with a dial command. The front end control unit handles the entire dialing sequence by presenting the dialed digits at the request of the automatic calling unit which signals when a connection has been made. When a telephone connection has been made, the modem associated with the automatic calling unit is connected to the telephone line. After the connection is made, the dial command is terminated and data may now be transmitted or received from the remote user on the telephone line via the modem and its associated interface in the same way as any other data is transmitted or received. The control path for dialing information is separate from the data communication path for the modem. This separation requires two specialized interfaces and higher overall system expense.

SUMMARY OF THE INVENTION

It is a primary object of this invention to provide apparatus for controlling automatic dialing apparatus over a single computer interface for both the transfer of data to the dialer and after establishing a call for the transfer of data to a modem also connected to the interface.

Briefly stated, the invention provides a dialer adapter for use with a plurality of modems and an automatic dialer. The dialer adapter controls the dialer to establish a data path between a computer and a telephone line via one of said modems in response to dialed digits presented to said dialer adapter over the same type of interface that is used to transfer information via the modem. A buffer in the dialer adapter is provided for storing control characters and dial digits from the computer interface. The last word stored in the buffer is a buffer empty control character. Control means controls the transfer of the data out of the buffer in parallel word by word to the dialer in response to control lines from the dialer which request dial digits. The buffer includes means for detecting the buffer empty character during the read out of the words from the buffer. In response to the detection of the buffer empty character word, the control means inhibits the transfer of dial digits to the dialer. The dialer signals when a connection has been made, activates the appropriate modem, and the computer transfers data via the modem.

In accordance with an aspect of the invention, the dialer adapter allows the computer to initiate and transmit dialing information to a dialer via a standard serial interface. All signaling takes place through characters sent from the computer on a first line and received from the adapter on a second line.

The invention has the advantage that automatic calling is possible through a multiplexer front end which does not utilize a separate dialer interface. The dialed digits are passed over the modem interface which is made possible bacause the dialer and the modem are never activated at the same time.

The invention has the further advantage that the information transfer is treated in character serial form, thus minimizing the number of lines necessary from the multiplexer front end.

The invention provides a programming and time advantage. A call in progress may be interdicted at any time before an associated dialer issues data set status (DSS) since all dialing information is saved in the RAM. This is especially advantageous in those computer systems which employ and I/O priority interrupt. Since the information is saved in the RAM, the computer may branch to a higher priority service routine and then return to the dialing routine without destroying the dial information. If for some reason the dialed call is aborted because of a busy condition, the entire call sequence need not be reinitiated by going back to the beginning of the I/O supervisor program. The dialing information stored in the RAM may be dialed out with the issuance of only two control characters by the computer. In addition, since the information is saved in the RAM the adapter is able to automatically redial the call repeatedly after receipt of abandon call/retry (ACR).

The foregoing and other objects, features and advantages of the invention will be apparent from the following more particular description of the preferred embodiments of the invention as illustrated in the accompanying drawings.

BRIEF DESCRIPTION OF FIGURES OF THE DRAWINGS

FIG. 1 is a simplified block diagram of a prior art computer-communication facility utilizing automatic calling units;

FIG. 2 is a simplified block diagram illustrating the adapter of the present invention in a multiprocessing application wherein more than one line must be accessed simultaneously;

FIG. 3 is a simplified block diagram illustrating the use of the adapter embodying the present invention in a multiline automatic calling system in a configuration which eliminates redundant adapters and dialers;

FIG. 4 is a more detailed block diagram of the adapters illustrated in FIGS. 2 and 3 which embody the principles of the present invention;

FIG. 5 is a timing diagram of a read operation; and

FIG. 6 is a timing diagram of a write operation.

DESCRIPTION

Referring now to FIG. 1, a prior art computer-communication facility for controlling automatic calling devices is shown. This type of system is more fully described in the above-identified Mackie et al U.S. Pat. No. 3,362,015. The front end multiplexer apparatus 10 is connected to the 801 dialer or automatic calling unit (ACU) 12 via a dialer interface 14. The dialer 12 is connected to a telephone line 16. A modem or data set 18 is also connected to the telephone line and communicates with the computer front end 10 via a modem interface 20. The front end 10 can handle a number of such telephone lines on a time-division multiplex basis by scanning the lines in sequence as more fully described in the Mackie et al patent. This arrangement has the disadvantage that a separate interface must be provided for transferring dial information to the dialer prior to the connection of a call.

The invention embodied in both FIGS. 2 and 3 provides two alternative configurations that relieve the front end hardware requirements and reduce overall system expense. The new configuration also enables new applications that were not possible with the prior art configuration.

Referring now to FIG. 2, the modem interface 22 is connected to a dialer adapter 24 and also to a modem 26. An 801 dialer 28 is provided for each telephone line to which connection is possible. The dialer adapter shares the interface with the modem for multiprocessing applications wherein more than one line is accessed simultaneously.

Briefly, the dialer adapter includes interface logic to the front end and interface logic to the dialer, a random access memory and its associated addressing control logic, and decoders for decoding control characters. The adapter converts serial bit stream data from the computer to parallel words which are stored in the RAM. The computer issues the desired telephone number in the form of dial digits which are stored in the RAM. A buffer empty character is also stored in the RAM to signify the end of the data. The dialer addresses a modem through the adapter and upon detection of dial tone transfers the number through the modem to the telephone line. Upon detection of answer tone, the dialer transfer control to the modem. The modem establishes a hand shake with a remote modem over the telephone line and full duplex operation is under way.

In the configuration shown in FIG. 3, one dialer adapter 30, attached to a modem interface 32 handles a plurality of modems 34 which are attached through their own separate modem interfaces 36 with the computer.

In FIG. 4, the dial adapter embodying the present invention is shown in more detail. The computer interface logic 40 interfaces the adapter to the computer front end. The dialer interface logic 42 interfaces the adapter with the 801 dialer. A master clock 44 is provided to synchronize the entire adapter. A universal asynchronous transmitter/receiver (UATR) is provided. This is comprised of a receiver output decoder portion 46, a transmitter input decoder portion 48 and UATR logic 50. A random access memory (RAM) 52 is provided for storage of dial digits and control characters. Finally, supervisory control logic 58 is provided for controlling the overall operation of the adapter.

Computer Interface Logic Operation

A computer interface event sequence is shown in Table I (below). The dialer and modem address digits are treated exactly like dialed digits. The dialer contains a two byte counter which differentiates the first two digits (dialer address and modem address) from the remaining digits. As shown in Table I, the dialing message sent to the adapter beings with the control character start text (STX) and ends with the buffer empty (SI) character followed by the end of the text (ETX) character. The dial information is transmitted between the STX and the SI characters. The messages are sent in serial ACSII format.

TABLE I
COMPUTER INTERFACE EVENT SEQUENCE

| Event Number | Interface | Adaptor |
|---|---|---|
| 1 | Send STX Character | Return Data Set Ready (DSR) |
| 2 | Send Dialer Address Digit | Store Address in RAM |
| 3 | Send Modem Address Digit | Store Address in RAM |
| 4 | Send Dial Digit Repeat 4 until all digits are dialed | Store Digit in RAM |
| 5 | Send SI Character | Store SI in RAM |
| 6 | Send ETX Character | Issue CRQ to Dialer |

Dialer Operation Sequence

The adapter operational sequence with the dialer over the interface 42 is shown in Table II (below). The first two digits sent to the dialer specify the dialer address, modem type, and modem address. The last digit in the block is the end of number (EON) digit. This digit causes the dialer to transfer control to the modem. The modem then monitors the telephone line to detect the answer tone.

The computer interface port transmits serial data over the transmitted data (TXD) line and receives adapter serial response data over the received data (RXD) line which terminates in the computer interface logic 40. The data set ready (DSR) line is used to indicate that the adapter is ready to receive data. The carrier detect (CXR) line is used to flag the interface that an adapter response character is being sent. When this flag drops, it indicates that transmission has been terminated. The use of these lines makes the adapter look like a modem to the computer interface port. An end text (ETX) command character decoded by the decoder 46 causes the supervisory control logic 58 to issue call request (CRQ) to the 801 dialers (event 1). All of the dialers respond with present next digit (PND). The adapter then places addresses and digits on the NB1-NB8 lines and issues digit present (DPR) in sequential order. A dialer and modem are selected and a desired number is dialed. Upon detection of answer tone, or when the adapter issues the EON code, the dialer transfers control to the selected modem and returns data set status (DSS) to the adapter (event 25). In the case of a modem busy or other busy condition, the dialer returns data line occupied (DLO) and/or abandon call/retry (ACR) to indicate this condition. Finally, the adapter turns off call request (CRQ), event 27.

TABLE II
DIALER INTERFACE EVENT SEQUENCE

| Event Number | Adaptor | Dialer |
|---|---|---|
| 1 | Turn on CRQ | |
| 2 | | Turn on PND |
| 3 | Set Address Digit 1 | |
| 4 | Turn on DPR | |
| 5 | | Read and Store Address 1 |
| 6 | | Turn off PND |
| 7 | Turn off DPR | |
| 8 | | Turn on PND |
| 9 | Set Address Digit 2 | |
| 10 | Turn on DPR | |
| 11 | | Read and Store Address 2 |
| 12 | | Turn off PND |
| 13 | Turn off DPR | |
| 14 | | Detect Dial Tone |
| 15 | | Turn on PND |
| 16 | Set Dial Digit | |
| 17 | Turn on DPR | |
| 18 | | Read Digit and Dial |
| 19 | | Turn off PND |
| 20 | Turn off DPR | |
| 21 | | Wait Interdigit Delay |
| 22 | | Turn on PND |
| | Repeat 16 thru 22 until all digits are Dialed. | |
| 23 | | Detect Answer Tone |
| 24 | | Transfer Control to Modem |
| 25 | | Turn on DSS |
| 26 | Sent "A" Character to Interface | |
| 27 | Reset CRQ | |

When the computer interface port transmits serial data over the TXD line, the receiver 46 converts this data to parallel and the adapter stores the data in the RAM 52. When the adapter responds to dialer information, the logic 50 converts parallel data into serial format and sends this serial data to the computer interface port via the transmitter serial output (TSO) line. Addresses and digits are stored in the RAM in the write mode and then presented to the dialer in the read mode. A third mode called the abort mode allows a call in progress to be interdicted and resumed later or optionally to be completely aborted.

Write Mode

Referring to the timing diagram of FIG. 5, a call sequence begins when the computer interface port sends the STX (start test) character to the adapter via the TXD (transmitted data) line (see Table I). The UATR logic 50 checks the character for the proper code format and parity. If there is a format error (FE), the adapter issues a "D" character via the RXD (received data) line and enters the abort mode. If a parity error (PE) occurs, the adapter issues an "E" character. Upon the termination of character transmission, the adapter drops the CXR (carried detect) flag and resets the adapter logic. Once the adapter enters the abort mode, the computer interface port either (1) reissues the STX character to retry the call, (2) sends the SOH (abort) character in which case the adapter acknowledges with a "B" response character and resets the logic, or (3) exits to another control program.

In the absence of a format or parity error, the adapter decodes the STX character and returns DSR (data set ready) to the interface logic 40. The RAM is then reset to address location 0 and the adapter is placed in the write mode. The STX character is not stored in the RAM. Upon the receipt of DSR, the computer interface port transfers digit 1 which contains the dialer address and modem type. This digit is stored in RAM address location 0 and the RAM is incremented (advance RAM line ARM) to address 1. Digits are transferred sequentially in this manner until either the last digit has been stored in the RAM or the RAM address limit has been exceeded. If the RAM address is exceeded, the adapter issues an "F" character via the RXD (received data) line and enters the abort mode.

Normally, no errors will have occurred and the RAM address limit will not have been exceeded in which case the computer interface port issues the SI (buffer empty) character. This character is stored in the RAM and it is used in the read mode (see FIG. 6) to inhibit DPR to the dialer. Finally, the interface port sends the ETX (end of text) character which terminates the write mode. Up to this point, the dialer address/modem type, the modem address, a number of dialed digits, and optionally the end of number (EON) digit have all been stored in the RAM followed by the buffer empty character (SI). Call request (CRQ) is then raised, initiating the read mode.

Read Mode

Upon receipt of the ETX (end text) character, the adapter resets the RAM address to zero and issues CRQ (call request) to the dialer via the dialer interface logic 42. Referring now to FIG. 6, each dialer responds with PND (present next digit). In response to PND, the supervisory control logic 58 causes the RAM to read out the contents of address 0 which contains the dialer address and raises the DPR (digit present) line to the dialer interface logic. When DPR is energized, the RAM is incremented (advance RAM line ARM) on the next clock pulse to address 1 which contains a modem address. This sequence continues, reading words from the RAM until the SI (buffer empty) character is detected at the RAM output. Upon detection of the SI character or upon reaching RAM limit (RLM), the dialer interface logic inhibits DPR to the dialer and unlatches the PND-DPR hand shake between the dialer and adapter.

If the dialer issues DLO (data line occupied), the adapter sends a "G" character to the interface logic 40 and enters the abort mode. If ACR (abandon call/retry) is issued from the dialer, the adapter will either send a "B" character to the interface logic 40 and enter the abort mode or automatically redial the call several seconds later. If is possible to redial the call because the RAM contents are saved after having been read. In the absence of DLO or ACR, the dialer returns DSS (data set status) upon detection of either the answer tone or the EON digit. The adapter sends an "A" character and CXR (carried detect) to the interface logic and resets the logic for the next call sequence.

Abort Mode

The abort mode is used to end a sequence wherein an error condition has been detected or the call cannot be completed. It is also possible to enter the abort mode to interdict a call in progress before the dialer has issued DSS in which event the call can be continued at a later time. The SOH (abort) character along with the fact that the RAM contents are always saved until written over on the next write cycle makes this possible. When SOH is issued, the adapter returns a "B" character to the computer interface port. The computer is then free to enter another service routine and reinitiate the call later at the point at which the call routine was exited.

If a format error or parity error is detected in the write mode, the UATR logic 50 energizes the PE or FE lines to the transmitter input decoder 48. The decoder returns either on encoded "D" or "E" character to the logic 50 which then transmits this character to the interface logic 40.

If the RAM limit is exceeded during the write mode, the RAM logic issues OVF (overflow) to the transmitter input decoder. The decoder then returns an encoded "F" character to the interface logic 40 via the UATR logic 50.

If the dialer returns DLO and/or ACR in the read mode, the transmitter input decoder issues either a "G" or "B" character to the UATR logic 50. These characters are also forwarded to the interface. If redialing is to occur, ACR will not be transmitted to the interface but in the alternative the adapter will automatically redial the call after a several second delay and then issue the "B" character.

In all of the above instances, flexibility is built in because the computer port software can be programmed in different ways. For example, the computer may issue the SOH character to abort the call and then retry the call later in which event only the STX and ETX characters need be issued to redial the call since the RAM contents have been saved.

SUMMARY

What has been described is an apparatus for controlling a dialer which, in response to dialed digits, automatically establishes communication paths between a plurality of telephone lines and a plurality of serial computer ports via one of a plurality of modems. Interface logic receives serial digital data from the computer port and stores the data in a random access memory (RAM) where the data is buffered. Logic converts the serial data to parallel prior to its being stored in the RAM. Control means are provided for operating the RAM in three modes: (1) a write mode in which addresses and digits are stored in the RAM; (2) a read mode in which the addresses and digits are presented to the dialer in parallel in response to control lines from the dialer; and (3) an abort mode in which a call in progress is interdicted and resumed later or completely aborted.

Control of data transfer between the two asynchronous interfaces, one on the computer port side and the other on the dialer side, is controlled by the storing of a buffer empty character in the RAM when all of the dial digits have been transferred from the interface port to the RAM. The digits are then read from the RAM and the end of the data transmission detected by detecting the buffer empty character.

| APPENDIX - LINE ABBREVIATIONS | |
|---|---|
| Computer Port/Adapter Interface | |
| TXD | Transmitted Data |
| RXD | Received Data |
| DSR | Data Set Ready |
| CXR | Carrier Detect |

| Adapter Dialer Interface | |
|---|---|
| ACR | Abandon Call/Retry |
| PND | Present Next Digit |
| DLO | Data Line Occupied |
| DSS | Data Set Status |
| NB1 | Binary Number 1 |
| NB2 | Binary Number 2 |
| NB4 | Binary Number 4 |
| NB8 | Binary Number 8 |
| CRQ | Call Request |

| -continued | |
|---|---|
| Adapter Dialer Interface | |
| DPR | Digit Present |

| Internal Adapter Signals | |
|---|---|
| TSO | Transmitter Serial Output |
| RSI | Receiver Serial Input |
| SRST | System Reset |
| MCLK | Master Clock |
| EOC | End-of-Character |
| STX | Start Text |
| ETX | End Text |
| SOH | Abort |
| DEN | Display Enable |
| PE | Parity Error |
| FE | Format Error |
| RWE | RAM Write Enable |
| RRST | RAM Reset |
| ARM | Advance RAM |
| RLM | RAM Limit |
| OVF | Overflow |
| RD | Receiver Data Outputs (1-7) |
| TD | Transmitter Data Inputs (0-7) |
| SI | Buffer Empty |
| EON | End of Number |

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an automatic calling system for use between a serial interface and a parallel dialer interface, for controlling the transmission of dial digits received over said serial interface to said dialer interface comprising:

an addressable buffer means for connection to said serial interface and said parallel dialer interface;

decoding means for connection to said serial interface for decoding control characters received over said serial interface and for producing a decoded output; and control means for connection to said decoding means and to said buffer means and responsive to said decoded output of said decoding means for controlling the transfer of digits into sequential address locations in said buffer means, starting with an initial address, in response to the decoding of a start text character by said decoding means, said control means further including means responsive to the decoding of an end text character by said decoding means for reading digits out of said buffer means for transmission to said dialer, starting with said initial address.

2. The combination in accordance with claim 1 wherein some of said digits include dial digits and wherein one of said digits is an empty character transmitted from said serial interface to said buffer, said one digit being stored following the storage of said dial digits, said buffer including means for detecting said empty character during readout of said buffer and means responsive to said detecting means for ending the transmission of characters from said buffer to said dialer.

3. In an apparatus for controlling a dialer which in response to dail digits automatically establishes communication paths between a plurality of telephone lines and a plurality of serial computer ports, comprising:

interface logic means for connection to one of said computer ports for receiving control characters and serial digital data from one of said computer ports;

memory means for connection to said interface logic means and said dialer for storing said digital data; and control means for connection to said dialer and said memory means for operating said memory means in: (1) a write mode in which addresses and digits are stored in said memory means, and (2) a read mode in which said addresses and digits are read from said memory means in parallel and are sent to said dialer in response to energization of control lines from said dialer.

4. The combination in accordance with claim 3 wherein said control means is placed in said write mode by a start text control character and is placed in said read mode by an end text character, said control means including means for connection to said interface logic means for decoding said control characters.

5. The combination in accordance with claim 3 wherein control of data transfer between said computer port and said dialer is controlled by the storing of an empty character in said memory following the dial digits transferred from the interface port to said memory, the end of the dial digit data being detected in said read mode by detecting the reading of said empty character.

6. In a method of controlling the transmission of dial information between a serial computer port and a parallel dialer interface comprising the steps of:
 (1) resetting a memory to an initial address location in response to receipt of a start transmission character from said computer port;
 (2) storing a dial address transmitted over said computer port in said initial address location;
 (3) incrementing said address location;
 (4) storing a dial digit transmitted over said computer port in said incremented address location;
 (5) repeatedly storing dial digits in sequential memory locations by repeating said steps (3) and (4); and
 (6) storing an overflow character transmitted over said computer port in said memory.

7. The method in accordance with claim 6 further comprising the steps of:
 (7) resetting said memory to said initial address in response to an end of text character received from said computer port;
 (8) energizing a call request line to said dialer;
 (9) transferring the dial digit stored in said memory address location to said dialer in response to energization of present next digit line by said dialer;
 (10) incrementing said memory address; and
 (11) repeating steps (9) and (10) until said empty character is read from said memory.

* * * * *